(12) United States Patent
Saka et al.

(10) Patent No.: US 9,698,414 B2
(45) Date of Patent: Jul. 4, 2017

(54) NON-AQUEOUS ELECTROLYTE SECONDARY BATTERY AND METHOD OF MANUFACTURING THE SAME

(71) Applicant: TOYOTA JIDOSHA KABUSHIKI KAISHA, Toyota-shi, Aichi-ken (JP)

(72) Inventors: Hideyuki Saka, Toyota (JP); Hideaki Fujita, Kyotanabe (JP); Keiichi Takahashi, Nishinomiya (JP); Hideki Sano, Ikeda (JP); Tatsuya Hashimoto, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 135 days.

(21) Appl. No.: 14/692,844

(22) Filed: Apr. 22, 2015

(65) Prior Publication Data

US 2015/0349329 A1 Dec. 3, 2015

(30) Foreign Application Priority Data

May 30, 2014 (JP) ................................. 2014-112441

(51) Int. Cl.

| | |
|---|---|
| *B05D 5/12* | (2006.01) |
| *H01M 4/36* | (2006.01) |
| *H01M 4/131* | (2010.01) |
| *H01M 4/04* | (2006.01) |
| *H01M 4/1391* | (2010.01) |
| *H01M 10/0525* | (2010.01) |
| *H01M 4/58* | (2010.01) |
| *H01M 4/02* | (2006.01) |
| *H01M 4/525* | (2010.01) |

(52) U.S. Cl.
CPC ......... *H01M 4/364* (2013.01); *H01M 4/0404* (2013.01); *H01M 4/131* (2013.01); *H01M 4/1391* (2013.01); *H01M 4/5825* (2013.01); *H01M 10/0525* (2013.01); *H01M 4/525* (2013.01); *H01M 2004/028* (2013.01)

(58) Field of Classification Search
CPC combination set(s) only.
See application file for complete search history.

(56) References Cited

U.S. PATENT DOCUMENTS

2010/0035141 A1* 2/2010 Grosvenor ........ H01M 10/0525
429/129

FOREIGN PATENT DOCUMENTS

JP 2011-228293 A 11/2011

* cited by examiner

*Primary Examiner* — Austin Murata
(74) *Attorney, Agent, or Firm* — Sughrue Mion, PLLC

(57) ABSTRACT

A non-aqueous electrolyte secondary battery includes a positive electrode composite material layer containing first positive electrode active material particles containing a lithium nickel composite oxide, second positive electrode active material particles containing lithium iron phosphate, and a conductive material. A ratio of the second positive electrode active material particles in a total mass of the first positive electrode active material particles and the second positive electrode active material particles is not lower than 5 mass % and not higher than 20 mass %. A standard deviation $\sigma$ representing distribution of an iron element satisfies a condition of $0.28 \leq \sigma \leq 0.52$ when distribution of the iron element is determined by conducting area analysis with an electron probe microanalyzer in a cross-section of the positive electrode composite material layer.

2 Claims, 13 Drawing Sheets

NON-AQUEOUS ELECTROLYTE SECONDARY BATTERY AND METHOD OF MANUFACTURING THE SAME

This nonprovisional application is based on Japanese Patent Application No. 2014-112441 filed with the Japan Patent Office on May 30, 2014, the entire contents of which are hereby incorporated by reference.

BACKGROUND OF THE INVENTION

Field of the Invention

The present invention relates to a non-aqueous electrolyte secondary battery and a method of manufacturing the same.

Description of the Background Art

Japanese Patent Laying-Open No. 2011-228293 discloses a non-aqueous electrolyte secondary battery including a positive electrode containing a first active material containing a lithium transition metal composite oxide expressed by a general formula $LiNi_xMn_yCo_zO_2$ (x+y+z=1, x>0, y>0, z>0) and a second active material containing $LiFePO_4$.

SUMMARY OF THE INVENTION

A non-aqueous electrolyte secondary battery containing a lithium nickel composite oxide alone as a positive electrode active material is dissatisfactory in output characteristics in a low charge state, that is, in low state of charge (SOC). Since an insertion reaction of lithium ions ($Li^+$) proceeds mainly in high to intermediate SOCs (approximately from 3.8 to 3.5 V) in a lithium nickel composite oxide, there are smaller number of vacancies at an $Li^+$ insertion site in a crystal in low SOC (approximately from 3.0 to 3.4 V) and a reaction resistance increases.

Japanese Patent Laying-Open No. 2011-228293 attempts to improve output characteristics in low SOC with a mixed positive electrode containing a lithium nickel composite oxide and lithium iron phosphate together. In lithium iron phosphate, an insertion reaction of $Li^+$ proceeds mainly around 3.0 to 3.4 V. Since this mixed positive electrode can thus accept $Li^+$ in low SOC, improvement in output in low SOC is expected.

When the present inventor has fabricated a non-aqueous electrolyte secondary battery including such a mixed positive electrode and studied performance thereof in detail, it has newly been found that though intended output characteristics can be obtained in an initial stage, the output characteristics significantly lowers after endurance, in particular, after cycle endurance.

The present invention was made in view of the problems above and an object thereof is to provide a non-aqueous electrolyte secondary battery excellent in initial output and post-endurance output in low SOC.

As a result of dedicated studies conducted by the present inventor, it has been found that distribution of lithium iron phosphate in a mixed positive electrode and output characteristics correlate with each other. The present inventor has further found a novel indicator better reflecting distribution of lithium iron phosphate and allowing control of output characteristics and completed the present invention. A non-aqueous electrolyte secondary battery according to the present invention includes features as follows.

[1] A non-aqueous electrolyte secondary battery includes a positive electrode composite material layer containing first positive electrode active material particles containing a lithium nickel composite oxide, second positive electrode active material particles containing lithium iron phosphate, and a conductive material. A ratio of the second positive electrode active material particles in a total mass of the first positive electrode active material particles and the second positive electrode active material particles is not lower than 5 mass % and not higher than 20 mass %. A standard deviation σ satisfies a condition of 0.28≤σ≤0.52, which is calculated in the following expression (1)

$$\sigma = \sqrt{\frac{1}{N}\sum_{i=1}^{N}(z_i-1)^2} \quad (1)$$

when distribution of an iron element is determined by extracting a square measurement region of which one side has a length at least 0.5 time and at most 1.0 time as large as a thickness of the positive electrode composite material layer from a cross-section of the positive electrode composite material layer in parallel to a direction of thickness of the positive electrode composite material layer and conducting area analysis with an electron probe microanalyzer in the measurement region, where $z_i$ represents a value obtained by normalizing $\Delta I_i$ by dividing the measurement region in N belt-shaped small regions $\Delta y_i$ (i=1, 2, ..., N) into the direction of thickness and dividing a sum value $\Delta I_i$ (i=1, 2, ..., N) of iron element detection intensity at each measurement point included in one small region $\Delta y_i$ by an average value I of $\Delta I_i$.

By quantifying distribution of lithium iron phosphate as standard deviation σ as described above and restricting a range of standard deviation σ which can be taken, a non-aqueous electrolyte secondary battery exhibiting excellent output characteristics not only in an initial stage but also after endurance can be provided.

Here, standard deviation σ is an indicator representing distribution of lithium iron phosphate in a positive electrode composite material layer, and it is obtained by conducting area analysis of a cross-section of the positive electrode composite material layer with an electron probe microanalyzer (EPMA) and determining distribution of an iron (Fe) element. A procedure for calculating σ will be described with reference to the drawings.

Referring initially to FIG. 1, a cross-section sample of a positive electrode composite material layer 100b is taken from any portion in a positive electrode plate 100 and observed with a scanning electron microscope (SEM). Here, a magnification for observation is set, for example, to approximately 100 to 500-fold and preferably to approximately 300-fold. According to the studies conducted by the present inventor, distribution of Fe in a cross-sectional structure observed under a magnification as such most correlates with an initial output and a post-endurance output.

Referring next to FIG. 1 and (a) in FIG. 2, a square measurement region MR of which one side has a length at least 0.5 time and at most 1.0 time as large as a thickness T (0.5T to 1.0T) of positive electrode composite material layer 100b is extracted from an observation field of view. In FIGS. 1 and 2, first positive electrode active material particles 11 contain a lithium nickel composite oxide, and second positive electrode active material particles 12 contain lithium iron phosphate. For simplification of the description of these figures, a conductive material 13 is not illustrated.

Measurement region MR is subjected to area analysis (element mapping) for Fe with the EPMA. Referring to (b) in FIG. 2, measurement region MR is divided into N belt-shaped small regions $\Delta y_i$ in a direction of thickness (a direction of a Y axis). Each $\Delta y_i$ extends in a direction orthogonal to the direction of thickness (a direction of an X axis), and includes a plurality of measurement points $\Delta x_j$ (j=1, 2, ..., N) therein. The number N of $\Delta y_i$s and $\Delta x_j$s, that is, the number of pixels in area analysis is determined depending on an electron beam diameter of the EPMA. An electron beam diameter is set, for example, to approximately 0.5 μm, and the number N is set, for example, to approximately 100.

At each measurement point $\Delta x_j$, a characteristic X-ray derived from Fe is detected and counted. Detection intensity thus obtained is illustrated as $d_j$ (j=1, 2, ..., N) in (b) of FIG. 2. $\Delta I_i$ can be calculated by summing $d_j$ for each $\Delta y_i$ in an expression (2) below.

$$\Delta I_i = \sum_{j=1}^{N} d_j \quad (2)$$

$\Delta I_i$ represents a numeric value indicating to which extent Fe is distributed at a certain position in the direction of the Y axis (that is, $\Delta y_i$).

Then, an average value I of $\Delta I_i$ is calculated in an expression (3) below, and $z_i$ is calculated by normalizing $\Delta I_i$ further in an expression (4) below.

$$I = \frac{1}{N}\sum_{i=1}^{N}\Delta I_i \quad (3)$$

$$z_i = \frac{\Delta I_i}{I} \quad (4)$$

As shown in (c) of FIG. 2, $z_i$ has been normalized and hence an average value thereof is 1. Then, based on the expression (1) above, σ can be calculated as a standard deviation of $z_i$. Standard deviation σ thus obtained includes information on distribution of Fe in the direction of the X axis in measurement region MR through a process of derivation thereof, and it is in particular a numeric value indicating with which variation Fe is distributed in the direction of the Y axis (the direction of thickness of positive electrode composite material layer 100b). Since $\Delta I_i$ has been normalized, σ can be treated equally even though a content of lithium iron phosphate in positive electrode composite material layer 100b may be varied (that is, an absolute amount of $\Delta I_i$ may be varied).

As a result of studies conducted by the present inventor about relation of standard deviation σ with an initial output and a post-endurance output of a non-aqueous electrolyte secondary battery, the following experimental fact was revealed when a ratio of second positive electrode active material particles containing lithium iron phosphate in a total mass of positive electrode active material particles is within a range not lower than 5 mass % and not higher than 20 mass %.

Description will be given hereinafter with reference to FIGS. 3 to 5 each schematically showing a state of distribution of the second positive electrode active material particles containing lithium iron phosphate. For simplification of the description, first positive electrode active material particles 11 are not illustrated in these figures.

According to results in experiments, when σ exceeds 0.52, post-endurance output lowers. When σ exceeds 0.52, it is expected that second positive electrode active material particles 12 are scattered in positive electrode composite material layer 100b as being aggregated to some extent as shown in FIG. 3. Here, conductive material 13 is present as adhering to an aggregate formed from second positive electrode active material particles 12 and ensures a conductive path between second positive electrode active material particles 12 and other components.

When a charging and discharging cycle is repeated, however, as shown in FIG. 4, the aggregate gradually breaks up as a result of expansion and contraction of lithium iron phosphate (second positive electrode active material particles 12). Here, some of second positive electrode active material particles 12 are disconnected from conductive material 13 and isolated from a conductive network. Loss in output after endurance is thus caused.

On the other hand, as σ is smaller, distribution of lithium iron phosphate becomes uniform and hence normally, improvement in output is expected. According to the results in the experiments, however, it was clarified that an initial output lowered when σ was smaller than 0.28. This may be because an amount of conductive material is insufficient with respect to individual lithium iron phosphate. As shown in FIG. 5, when σ is smaller than 0.28, dispersion of lithium iron phosphate (second positive electrode active material particles 12) is excessive, and a probability that individual second positive electrode active material particles 12 can be present at such positions that they can maintain contact with conductive material 13 lowers. Therefore, some of second positive electrode active material particles 12 are isolated from the conductive network from the initial stage and cannot contribute to the initial output.

From the foregoing, the present invention restricts σ to a range not smaller than 0.28 and not greater than 0.52 and thereby provides a non-aqueous electrolyte secondary battery excellent in an initial output and a post-endurance output in low SOC.

The present invention provides also a method of manufacturing a non-aqueous electrolyte secondary battery as follows.

[2] A method of manufacturing a non-aqueous electrolyte secondary battery is a method of manufacturing the non-aqueous electrolyte secondary battery described in [1] above, and includes the steps of obtaining a first positive electrode composite material paste by mixing the first positive electrode active material particles containing the lithium nickel composite oxide, the conductive material, a binder, and a solvent, obtaining a second positive electrode composite material paste by mixing the second positive electrode active material particles containing lithium iron phosphate, the conductive material, a binder, and a solvent, obtaining a third positive electrode composite material paste by mixing the first positive electrode composite material paste and the second positive electrode composite material paste with each other, and forming the positive electrode composite material layer by coating a positive electrode collector with the third positive electrode composite material paste. In this manufacturing method, a ratio of the second positive electrode active material particles in a total mass of the first positive electrode active material particles and the second positive electrode active material particles in the positive electrode composite material layer is not lower than 5 mass % and not higher than 20 mass %, and the positive electrode composite material layer is formed such that standard deviation σ satisfies a condition of 0.28≤σ≤0.52.

Conventionally, in a case that a plurality of types of positive electrode active material particles are used, a positive electrode composite material paste has been fabricated by collectively mixing and kneading them together. With this method, however, it has been difficult to control a state of distribution of each type of positive electrode active material particles and a conductive material in a positive electrode composite material layer and σ cannot be restricted as above. In contrast, in the manufacturing method according to the present invention, a positive electrode composite material paste is obtained by fabricating a paste for each type of positive electrode active material particles and then mixing pastes. Thus, a state of dispersion in particular of second positive electrode active material particles 12 and conductive material 13 can be controlled, and σ can be restricted within a range not smaller than 0.28 and not greater than 0.52.

[3] Standard deviation σ satisfies preferably a condition of 0.30≤σ≤0.50 and further preferably a condition of 0.30≤σ≤0.45. Thus, balance between an initial output and a post-endurance output is further improved.

[4] Preferably, a ratio of a total mass of the first positive electrode active material particles and the second positive electrode active material particles in the positive electrode composite material layer is not lower than 87 mass % and not higher than 97 mass %, and a ratio of the conductive material therein is preferably not lower than 2 mass % and not higher than 8 mass %. As the positive electrode composite material layer has such a composition, standard deviation σ is readily controlled to the specific range above.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Though one embodiment of the present invention (hereinafter also denoted as the "present embodiment") will be described hereinafter in detail, the present embodiment is not limited thereto. In the description below, an average particle size represents a median diameter (what is called d50) measured with a laser diffraction and scattering method.

[Non-Aqueous Electrolyte Secondary Battery]

Figure 9:
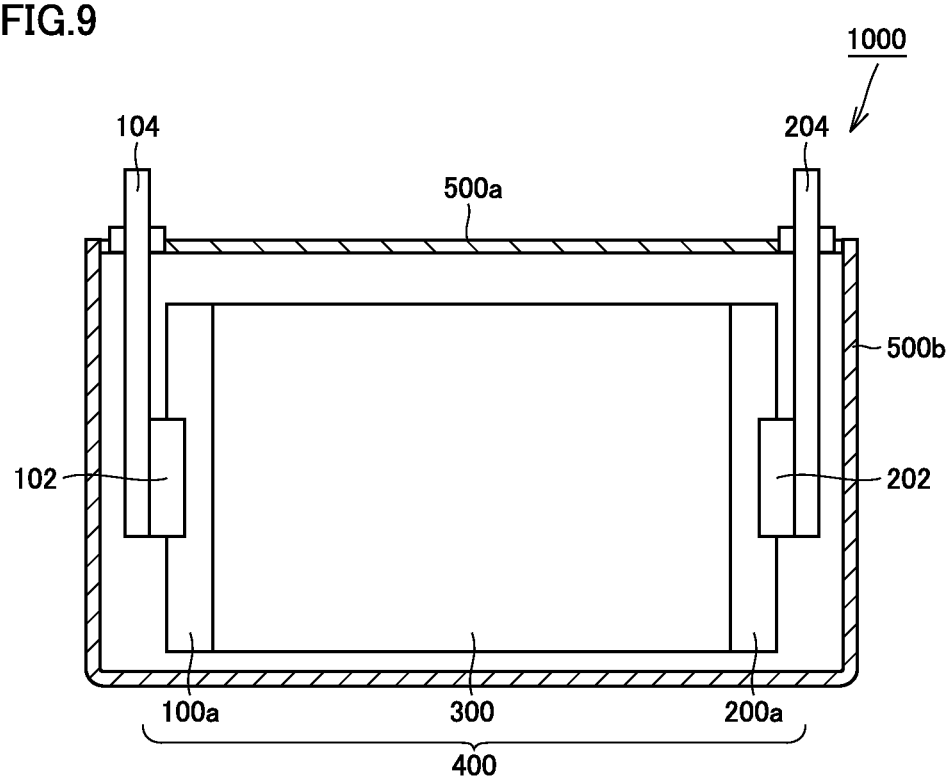
FIG. 9 is a schematic cross-sectional view showing one example of a construction of a non-aqueous electrolyte secondary battery according to one embodiment of the present invention.

FIG. 9 is a schematic cross-sectional view showing one example of a construction of a non-aqueous electrolyte secondary battery according to the present embodiment. Referring to FIG. 9, a battery 1000 includes an electrode assembly 400 and a non-aqueous electrolyte (not shown) in an exterior body (a lid body 500a and a case 500b) in a prismatic shape. For example, an Al alloy is employed for a material for the exterior body.

Figure 6:
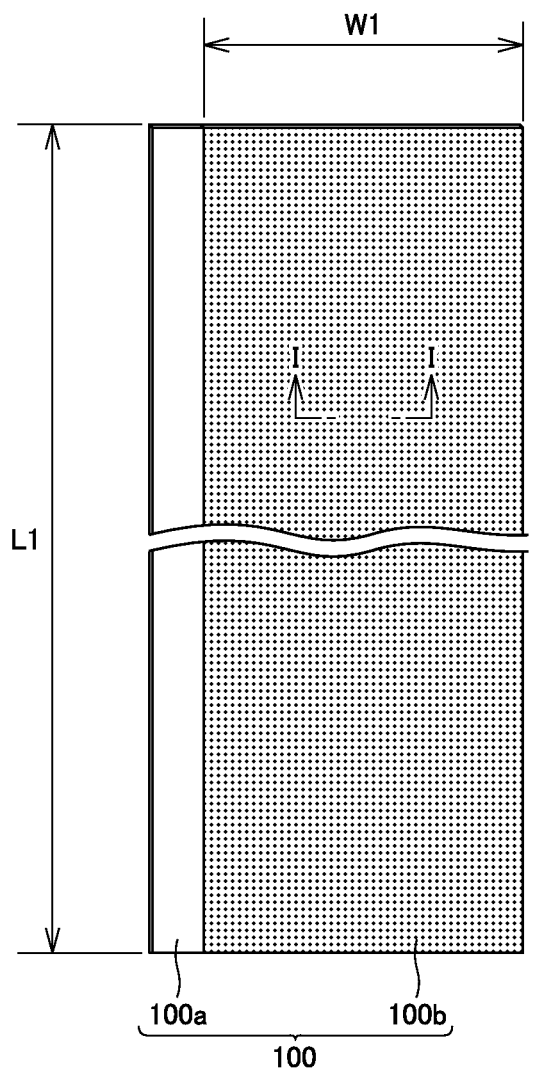
FIG. 6 is a schematic plan view showing one example of a construction of a positive electrode plate according to one embodiment of the present invention.
Figure 7:
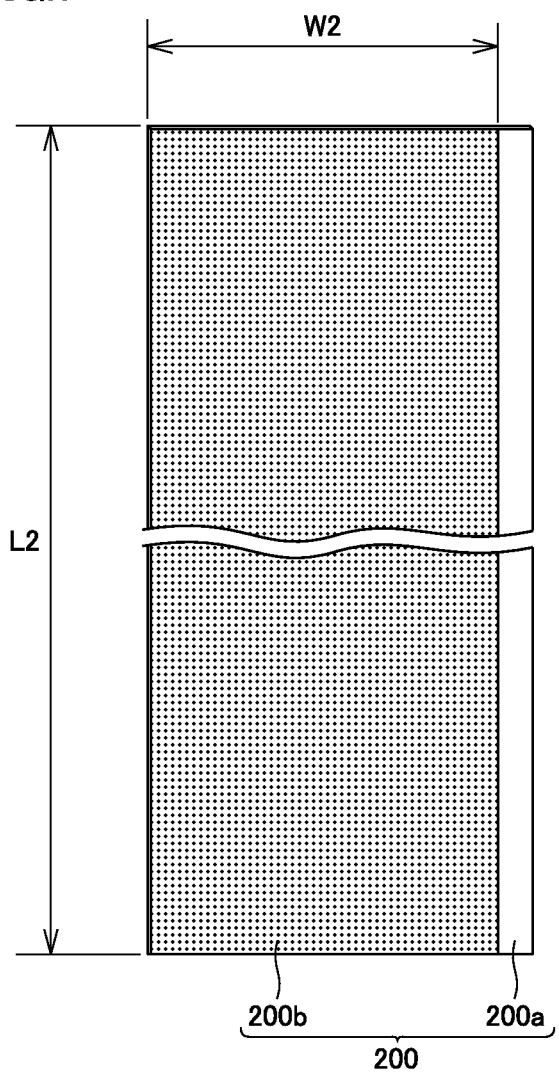
FIG. 7 is a schematic plan view showing one example of a construction of a negative electrode plate according to one embodiment of the present invention.

Electrode assembly 400 has positive electrode plate 100, a negative electrode plate 200, and a separator 300. Referring to FIGS. 6 and 7, positive electrode plate 100 and negative electrode plate 200 are each a sheet member in an elongated belt shape, and has a non-composite-material portion where a collector (a core material) is continuously exposed, on one side in a direction of a short side (a direction of width).

Figure 8:
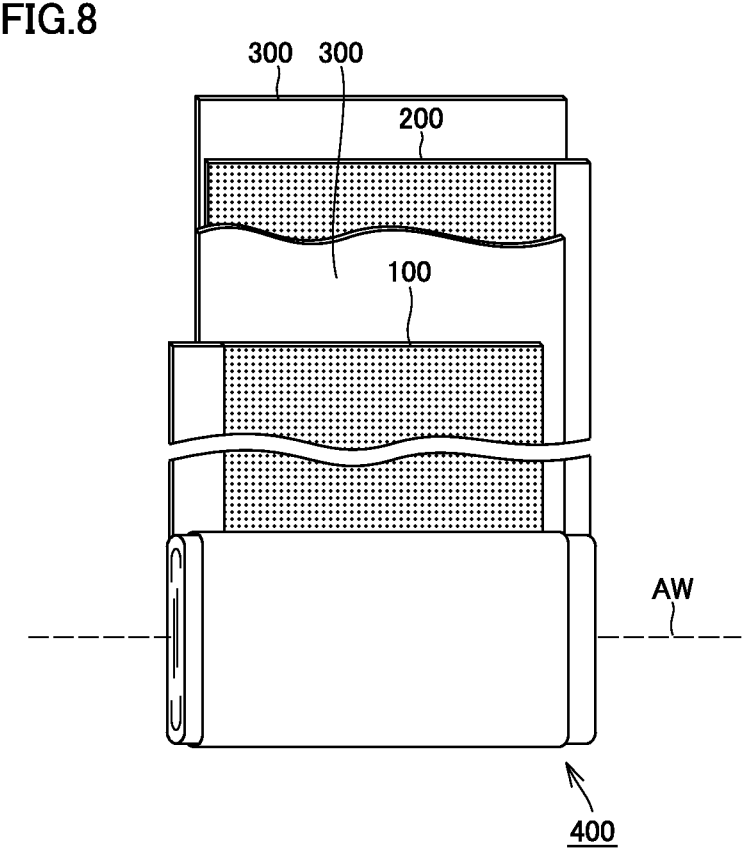
FIG. 8 is a schematic diagram showing one example of a construction of an electrode assembly according to one embodiment of the present invention.

Referring to FIG. 8, electrode assembly 400 is formed by winding positive electrode plate 100 and negative electrode plate 200 such that they are opposed to each other with separator 300 lying therebetween. As shown in FIG. 8, the non-composite-material portions of positive electrode plate 100 and negative electrode plate 200 are exposed in directions different from each other along an axis of winding AW of electrode assembly 400.

Referring again to FIG. 9, in electrode assembly 400, the non-composite-material portion of positive electrode plate 100 (a portion where a part of a positive electrode collector 100a is exposed) is connected to a positive electrode terminal 104 through a positive electrode collector plate 102, and the non-composite-material portion (a portion where a part of a negative electrode collector 200a is exposed) of negative electrode plate 200 is connected to a negative electrode terminal 204 through a negative electrode collector plate 202.

Each member forming battery 1000 will now be described.

<Positive Electrode Plate>

Figure 1:
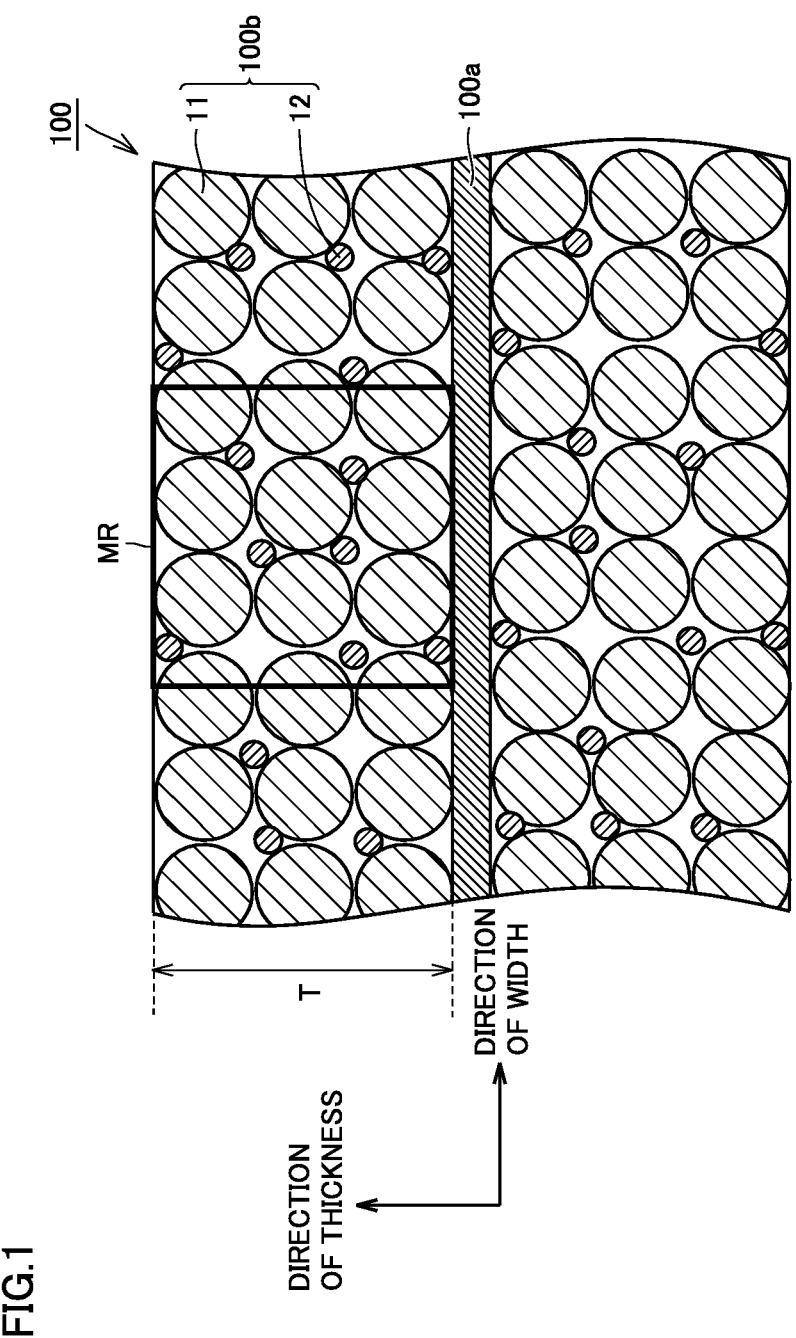
FIG. 1 is a schematic partial cross-sectional view along the line I-I in FIG. 6, showing one example of a construction of a positive electrode plate according to one embodiment of the present invention.
Figure 2:
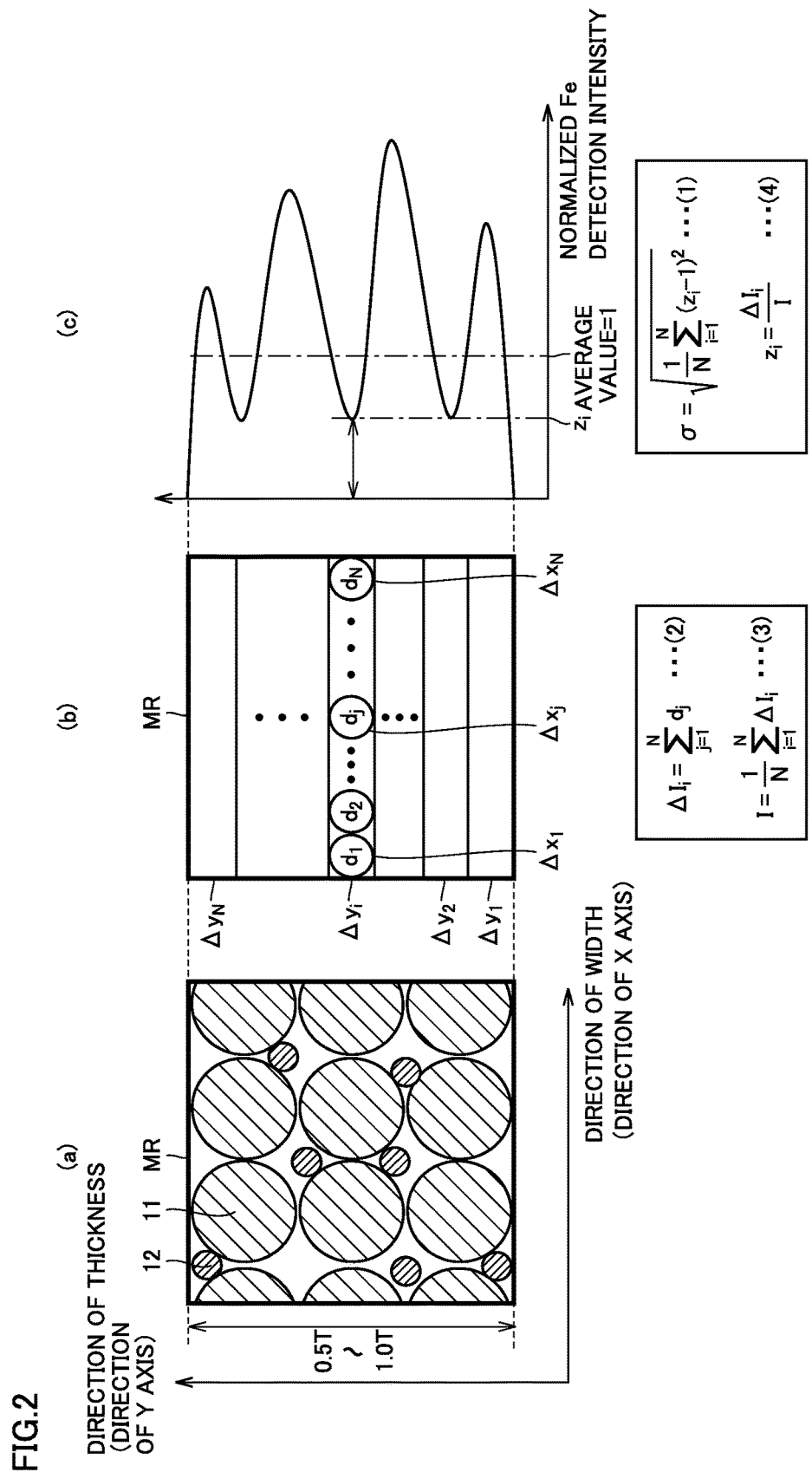
FIG. 2 is a schematic diagram illustrating a data analysis method in EPMA measurement according to one embodiment of the present invention.
Figure 3:
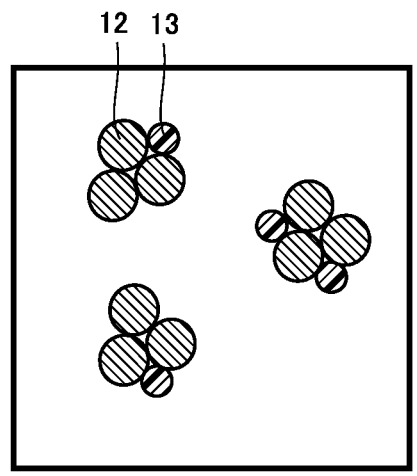
FIG. 3 is a schematic diagram illustrating a state of distribution of lithium iron phosphate in a positive electrode composite material layer according to one embodiment of the present invention.
Figure 4:
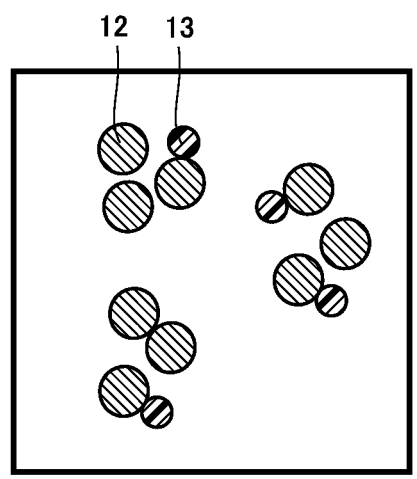
FIG. 4 is a schematic diagram illustrating another state of distribution of lithium iron phosphate in a positive electrode composite material layer according to one embodiment of the present invention.
Figure 5:
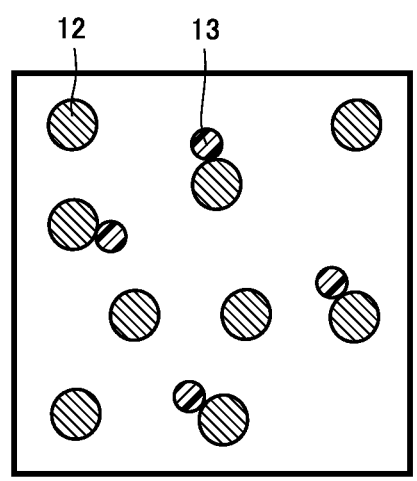
FIG. 5 is a schematic diagram illustrating yet another state of distribution of lithium iron phosphate in a positive electrode composite material layer according to one embodiment of the present invention.

FIG. 1 is a schematic partial cross-sectional view of positive electrode plate 100 along the line I-I in FIG. 6.

Referring to FIG. 1, positive electrode plate 100 has positive electrode composite material layer 100b formed on each main surface of positive electrode collector 100a. Positive electrode collector 100a is formed, for example, from an Al foil.

(Positive Electrode Composite Material Layer)

Positive electrode composite material layer 100b is formed by fixing a positive electrode composite material containing first positive electrode active material particles 11, second positive electrode active material particles 12, conductive material 13, and a binder (not shown) on positive electrode collector 100a. Positive electrode composite material layer 100b has thickness T, for example, approximately from 10 to 200 μm, preferably approximately from 30 to 150 μm, and more preferably approximately from 40 to 100 μm. Positive electrode composite material layer 100b has a composite material density, for example, approximately from 2.0 to 4.0 g/cm³.

The "positive electrode active material particles" herein encompass primary particles composed of a positive electrode active material, secondary particles which are an aggregate of the primary particles, and composite particles in which a covering layer or the like is formed on surfaces of the primary particles or the secondary particles.

(First Positive Electrode Active Material Particles)

First positive electrode active material particles 11 contain a lithium nickel composite oxide. The lithium nickel composite oxide is a composite oxide including Li and Ni as essential constituent elements, and refers to a compound expressed by a general formula $LiNi_{1-x}M_xO_2$ (where M represents one or more elements selected from Co, Mn and Al, and x satisfies $0 \leq x < 1$).

Specific examples of such a compound include, for example, $LiNiO_2$, $LiNi_{0.8}Co_{0.2}O_2$, $LiNi_{0.8}Co_{0.15}Al_{0.05}O_2$, $LiNi_{0.5}Mn_{0.5}O_2$, $LiNi_{1/3}Mn_{1/3}Co_{1/3}O_2$ and the like. The lithium nickel composite oxide is excellent in energy density in high to medium SOCs. Among them, a compound expressed by a general formula $LiNi_aCo_bMn_cO_2$ (where $0<a<1$, $0<b<1$ and $0<c<1$, and relation of $a+b+c=1$ is satisfied) and represented by $LiNi_{1/3}Mn_{1/3}Co_{1/3}O_2$ is excellent in balance between energy density and thermal stability. Therefore, the compound is particularly suitable for first positive electrode active material particles 11.

In the general formula $LiNi_aCo_bMn_cO_2$, a, b and c in the formula satisfy more preferably a condition of $0.2<a<0.4$, $0.2<b<0.4$ and $0.2<c<0.4$ and further preferably a condition of $0.3<a<0.35$, $0.3<b<0.35$ and $0.3<c<0.35$. This is because when a composition ratio among Ni, Co and Mn satisfies the aforementioned relation, the balance between energy density and thermal stability is further improved.

The lithium nickel composite oxide may be doped with a small amount of an added element. Examples of the added element can include, for example, Mg, Si, Ca, Ti, V, Cr, Zn, Ga, Zr, Nb, Mo, Sn, Hf, W and the like.

From a viewpoint of ease in realization of a suitable state of dispersion in positive electrode composite material layer 100b, an average particle size of first positive electrode active material particles 11 is, for example, approximately from 1 to 20 μm, preferably approximately from 3 to 15 μm, and more preferably approximately from 5 to 10 μm.

(Second Positive Electrode Active Material Particles)

Second positive electrode active material particles 12 contain lithium iron phosphate. Lithium iron phosphate is composite phosphate expressed by a chemical formula $LiFePO_4$, and has an olivine-type crystal structure. As for lithium iron phosphate in the present embodiment, a part of Fe in the aforementioned chemical formula may be substituted with different element (e.g., Co, Ni, Mn and the like) so long as output characteristics in low SOC are not excessively lowered. Lithium iron phosphate may be doped with a small amount of the added element described previously.

Second positive electrode active material particles 12 may be composite particles having a conductive layer on a surface of lithium iron phosphate. By doing so, conductivity of lithium iron phosphate is compensated for and output characteristics are further improved. For example, a common carbon covering layer can be adopted as the conductive layer. At this time, though an amount of covering is not particularly limited, a mass ratio between a base material (lithium iron phosphate) and the covering layer (carbon) is, for example, approximately from 98:2 to 99:1.

From a viewpoint of ease in realization of a suitable state of dispersion in positive electrode composite material layer 100b, an average particle size of second positive electrode active material particles 12 is, for example, approximately from 0.5 to 5 μm, preferably approximately from 0.5 to 3 and more preferably approximately from 0.5 to 1.5 μm.

A ratio of second positive electrode active material particles 12 in a total mass of first positive electrode active material particles 11 and second positive electrode active material particles 12 is required to be not lower than 5 mass % and not higher than 20 mass %. By controlling a state of dispersion of second positive electrode active material particles 12 within this range, an initial output and a post-endurance output can both be achieved.

From a viewpoint of energy density of a battery, a ratio of the total mass of first positive electrode active material particles 11 and second positive electrode active material particles 12 in positive electrode composite material layer 100b is preferably not lower than 87 mass % and not higher than 97 mass %, more preferably not lower than 89 mass % and not higher than 95 mass %, and particularly preferably not lower than 91 mass % and not higher than 93 mass %.

(Conductive Material)

Conductive material 13 is not particularly restricted, and a conventionally-known material can be used. For example, acetylene black (AB), Ketjen Black (registered trademark), graphite, vapor-grown carbon fiber (VGCF) and the like can be used. A ratio of conductive material 13 in positive electrode composite material layer 100b is preferably not lower than 2 mass % and not higher than 8 mass % and more preferably not lower than 3 mass % and not higher than 7 mass %. As positive electrode composite material layer 100b contains conductive material 13 in such a range, contact between each positive electrode active material particle and conductive material 13 can be ensured without impairing energy density.

(Binder)

A binder is not particularly restricted either, and a conventionally-known material can be used. For example, polyvinylidene difluoride (PVdF), polytetrafluoroethylene (PTFE) and the like can be used. A ratio of the binder in positive electrode composite material layer 100b is, for example, approximately from 1 to 10 mass %, preferably approximately from 1 to 7 mass %, and more preferably approximately from 2 to 4 mass %.

(Analysis of Cross-Section with EPMA)

As described previously, in the present embodiment, when a cross-section sample is taken from positive electrode composite material layer 100b and the cross-section sample is subjected to EPMA analysis, distribution (that is, standard deviation σ) of an Fe element derived from second positive electrode active material particles 12 satisfies a condition of $0.28 \leq \sigma \leq 0.52$.

The cross-section sample can be taken from any portion in positive electrode composite material layer 100b. Though the number of cross-section samples subjected to measurement is not particularly restricted, a plurality of samples are desirably taken. For example, in a case of positive electrode plate 100 in an elongated belt shape shown in FIG. 6, desirably, positive electrode composite material layer 100b is divided into approximately 6 to 20 parts by dividing positive electrode composite material layer 100b into 3 to 5 in a longitudinal direction and into 2 to 4 in the direction of the short side (the direction of width) in a plan view, approximately half of those parts are selected for determination of σ, and an average value thereof is found. According to such a method, σ reflecting a state of dispersion in the entire positive electrode composite material layer 100b is obtained.

In EPMA analysis, cross-section samples can be fabricated with a conventionally known method. For example, a cross-section cut with a cutter is subjected to cross-section processing with the use of a cross-section polisher (CP) or a focused ion beam apparatus (FIB), and thus a clean cross-section sample can be obtained.

The cross-section sample (a measurement target surface) is desirably in parallel to a direction of thickness of positive electrode composite material layer 100b as much as possible, however, it does not necessarily have to be completely in parallel. An angle formed between the measurement target surface and the direction of thickness of positive electrode composite material layer 100b is preferably not smaller than 0° and not greater than 10°, more preferably not smaller than 0° and not greater than 5°, and particularly preferably not smaller than 0° and not greater than 3°.

After the cross-section processing with the CP or the like, the cross-section is observed with an SEM. A magnification for observation should only be adjusted as appropriate in accordance with a size of the sample. A magnification of observation is set, for example, to approximately 100 to 500-fold and preferably to approximately 300-fold.

Referring to FIG. 1, square measurement region MR of which one side has a length at least 0.5 time and at most 1.0 time as large as thickness T (that is, not smaller than 0.5T and not greater than 1.0T) of positive electrode composite material layer 100b is extracted from an SEM image (an observation field of view). In specifying a state of dispersion of second positive electrode active material particles 12, one side of measurement region MR desirably has a length as close as possible to thickness T. One side of measurement region MR has a length preferably at least 0.6 time and at most 1.0 time as large as thickness T, more preferably at least 0.7 time and at most 1.0 time as large as thickness T, and particularly preferably at least 0.8 time and at most 1.0 time as large as thickness T.

Measurement region MR is subjected to Fe element mapping with the use of the EPMA. Suitable measurement conditions in the present embodiment are as follows.

(Conditions for Measurement with EPMA)
Electron beam diameter: approximately from 0.1 to 10 μm (preferably around 0.5 μm)
Acceleration voltage: approximately from 5 to 30 kV (preferably around 15 kV)
Beam current: approximately from 1 to 10000 nA (preferably around 100 nA)
Measurement time period: from 10 to 50 msec/pixel (preferably around 30 msec/pixel)
The number of pixels (N×N): approximately from 50×50 to 500×500 pixels (preferably around 100×100 pixels)

Based on results of measurement, in accordance with the procedure described previously, σ is calculated in the expressions (1) to (4) above. When σ satisfies a condition of $0.28 \leq \sigma \leq 0.52$ here, a non-aqueous electrolyte secondary battery can exhibit an excellent output in the initial stage and after endurance. According to results in experiments conducted by the present inventor which will be described later, σ satisfies more preferably a condition of $0.30 \leq \sigma \leq 0.50$ and particularly preferably a condition of $0.30 \leq \sigma \leq 0.45$.

<Negative Electrode Plate>

Referring to FIG. 7, negative electrode plate 200 is a sheet member in an elongated belt shape, and it has negative electrode collector 200a and a negative electrode composite material layer 200b formed on negative electrode collector 200a. Negative electrode collector 200a is formed, for example, of a Cu foil. Negative electrode composite material layer 200b has a composite material density, for example, approximately from 0.5 to 2.5 g/cm$^3$.

Negative electrode composite material layer 200b is formed by fixing a negative electrode composite material containing a negative electrode active material and a binder on negative electrode collector 200a. A negative electrode active material is not particularly restricted, and it should only be able to function as a negative electrode active material in a non-aqueous electrolyte secondary battery. For example, a carbon-based negative electrode active material such as graphite or an alloy-based negative electrode active material such as Si or Sn can be employed. A ratio of the negative electrode active material in negative electrode composite material layer 200b is, for example, approximately from 90 to 99 mass %.

A binder is not particularly restricted either, and for example, a conventionally known material such as carboxymethyl cellulose (CMC), styrene-butadiene rubber (SBR), and the like can be used. A ratio of the binder in negative electrode composite material layer 200b is, for example, approximately from 1 to 10 mass %. CMC also functions as a thickener in a negative electrode composite material paste which will be described later.

<Separator>

Separator 300 allows Li$^+$ to pass therethrough and prevents electric contact between positive electrode plate 100 and negative electrode plate 200. From viewpoints of mechanical strength and chemical stability, separator 300 is preferably formed from a microporous membrane made of a polyolefin-based material. For example, a microporous membrane made of polyethylene (PE), polypropylene (PP) or the like is suitable. Separator 300 can have a thickness, for example, approximately from 5 to 40 μm. A pore size and a porosity of separator 300 should only be adjusted as appropriate such that an air permeability has a desired value.

<Non-Aqueous Electrolyte>

A non-aqueous electrolyte is a liquid electrolyte obtained by dissolving a solute (Li salt) in an aprotic solvent. For example, cyclic carbonates such as ethylene carbonate (EC), propylene carbonate (PC), butylene carbonate (BC), γ-butyrolactone (GBL), and vinylene carbonate (VC) and chain carbonates such as dimethyl carbonate (DMC), ethyl methyl carbonate (EMC) and diethyl carbonate (DEC) can be used as the aprotic solvent. From viewpoints of electric conductivity and electrochemical stability, it is desirable to use two or more of these aprotic solvents together as appropriate. Particularly, it is preferable to use the cyclic carbonate and the chain carbonate as being mixed, and a volume ratio between the cyclic carbonate and the chain carbonate is preferably approximately from 1:9 to 5:5.

For example, lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(trifluoromethanesulfonyl)imide [$Li(CF_3SO_2)_2N$], lithium trifluoromethanesulfonate ($LiCF_3SO_3$) and the like can be used as the Li salt. Two or more of these Li salts may be used together. A concentration of the Li salt in the non-aqueous electrolyte is not particularly limited, however, from viewpoints of discharge characteristics and storage characteristics, the concentration is preferably approximately from 0.5 to 2.0 mol/L. In the present embodiment, a non-aqueous electrolyte in a form of a gel or a solid can also be employed.

[Method of Manufacturing Non-Aqueous Electrolyte Secondary Battery]

A non-aqueous electrolyte secondary battery according to the present embodiment can be manufactured with a manufacturing method described below.

Figure 10:
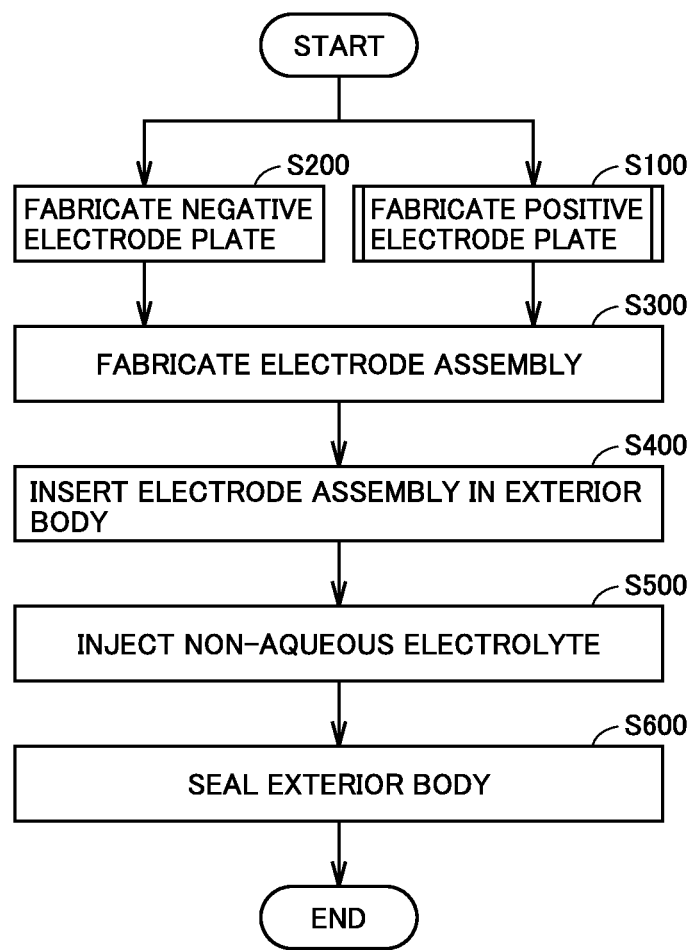
FIG. 10 is a flowchart showing overview of a method of manufacturing a non-aqueous electrolyte secondary battery according to one embodiment of the present invention.

FIG. 10 is a flowchart showing overview of a method of manufacturing a non-aqueous electrolyte secondary battery according to the present embodiment. Referring to FIG. 10, the manufacturing method includes a step S100, a step S200, a step S300, a step S400, a step S500, and a step S600, and it is characterized particularly by the step S100 (a step of fabricating a positive electrode).

Each step will be described below.

<Step S100>

Figure 11:
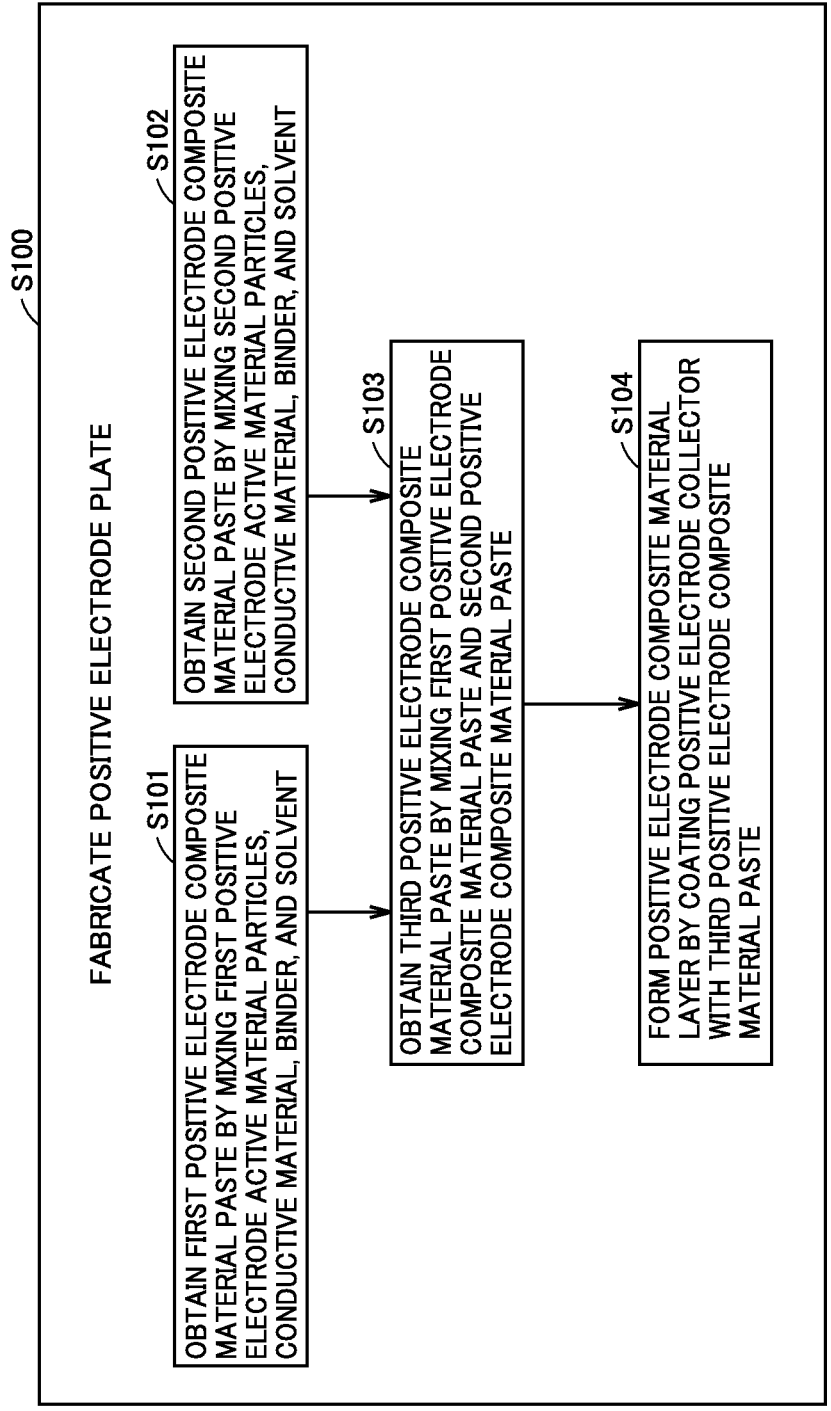
FIG. 11 is a flowchart showing overview of a step of fabricating a positive electrode plate according to one embodiment of the present invention.

In the step S100, positive electrode plate 100 is fabricated. Referring to FIG. 11, the step S100 includes a step S101, a step S102, a step S103, and a step S104. The present embodiment is different from the conventional technique in that a positive electrode composite material paste is fabricated for each type of positive electrode active material particles and a final positive electrode composite material paste is obtained by mixing positive electrode composite material pastes.

(Step S101)

In the step S101, a first positive electrode composite material paste is obtained by mixing first positive electrode active material particles, a conductive material, a binder, and a solvent. A conventionally known mixer can be employed as a mixer. For example, a mixer including a planetary-type main stirring blade [a planetary mixer (hereinafter abbreviated as "PLM")] and a sub stirring blade which can rotate at a high speed [a disper (hereinafter abbreviated as "DS")] is suitable.

Though a mixing method is not particularly restricted, preferably, each operation of dry-mixing (powder-mixing), high-shear-mixing, and dilution and dispersion is performed. Specifically, initially, in a mixer, powders of each of the first positive electrode active material particle, the conductive material, and the binder are dry-mixed with the use of the PLM. Then, a prescribed amount of solvent is added to obtain a highly viscous mixture, and mixing is carried out with the use of the PLM while strong shear force is applied (high-shear-mixing). A positive electrode composite material paste can be obtained by adding a prescribed amount of solvent for dilution of the mixture and stirring the mixture with the use of the PLM and the DS (dilution and dispersion). For example, N-methyl-2-pyrrolidone (NMP) is suitable as a solvent.

A state of dispersion of the positive electrode active material particles and the conductive material as well as a state of contact of these materials can be controlled mainly based on conditions for high-shear-mixing (for example, the number of rotations of the PLM or a time period for mixing). Namely, σ can be controlled based on conditions for high-shear-mixing. A concentration of a solid content in the mixture during high-shear-mixing is generally not lower than 75 mass % and preferably around 80 mass %. Specific conditions for mixing can be, for example, the number of rotations of the PLM approximately from 30 to 50 rpm and a time period for mixing approximately from 30 to 90 minutes, although depending on a batch amount and specifications of the mixer.

In dilution and dispersion, a concentration of a solid content in the mixture can be approximately from 50 to 70 mass %, the number of rotations of the PLM can be approximately from 10 to 30 rpm, the number of rotations of the DS can be approximately from 1500 to 3500 rpm, and a time period for mixing can be approximately from 5 to 20 minutes.

(Step S102)

In the step S102, a second positive electrode composite material paste is obtained by mixing second positive electrode active material particles, a conductive material, a binder, and a solvent. The second positive electrode composite material paste can also be fabricated with a method the same as the method for the first positive electrode composite material paste above, and σ can be controlled with a similar method.

(Step S103)

In the step S103, a third positive electrode composite material paste is obtained by mixing the first positive electrode composite material paste and the second positive electrode composite material paste with each other. A mixer used for fabricating a paste can be employed also for mixing the first positive electrode composite material paste and the second positive electrode composite material paste with each other. Regarding conditions for mixing, the number of rotations of the PLM can be approximately from 10 to 30 rpm, the number of rotations of the DS can be approximately from 1500 to 3500 rpm, and a time period for mixing can be approximately from 10 to 30 minutes.

(Step S104)

In the step S104, positive electrode composite material layer 100b is formed by coating positive electrode collector 100a with the positive electrode composite material paste and drying the positive electrode composite material paste. A method of coating the positive electrode collector with the paste is not particularly restricted, and a conventionally known method can be employed. For example, a die coating method or a gravure coating method can be employed. After drying, a thickness and a composite material density of positive electrode composite material layer 100b may be adjusted by rolling positive electrode composite material layer 100b.

As above, such positive electrode plate 100 that standard deviation σ in positive electrode composite material layer 100b satisfies a condition of $0.28 \leq \sigma \leq 0.52$ can be manufactured.

<Step S200>

In the step S200, negative electrode plate 200 is fabricated. Negative electrode plate 200 can be fabricated by obtaining a negative electrode composite material paste by mixing and kneading a negative electrode active material, a thickener, and a binder in water and forming negative electrode composite material layer 200b by coating negative electrode collector 200a with the negative electrode composite material paste and drying the paste. Here, a thickness and a composite material density of negative electrode composite material layer 200b may be adjusted by rolling negative electrode composite material layer 200b.

<Step S300 to Step S600>

Electrode assembly 400 can be fabricated by winding or stacking positive electrode plate 100 and negative electrode plate 200 such that they are opposed to each other with separator 300 lying therebetween (step S300). Then, electrode assembly 400 is inserted in the exterior body (case 500b) and lid body 500a and case 500b are joined to each other with prescribed means (for example, laser welding) (step S400). Furthermore, a non-aqueous electrolyte is injected through an inlet provided in lid body 500a (step S500), and thereafter the inlet is sealed (step S600). Thus, the non-aqueous electrolyte secondary battery (battery 1000) in the present embodiment can be manufactured.

Though the present embodiment has been described above by way of example of a battery in a prismatic shape, such description is merely by way of example. The present embodiment is not limited to the battery in a prismatic shape but is also applicable to a cylindrical battery or a pouch-type battery (also referred to as a laminate-type battery).

EXAMPLES

Though the present embodiment will be described hereinafter in further detail with reference to Examples, the present embodiment is not limited thereto.

[Fabrication of Non-Aqueous Secondary Battery]

As set forth below, a positive electrode composite material paste was obtained with various conditions being varied, a positive electrode plate was fabricated with the positive electrode composite material paste, and standard deviation σ was determined with a plurality of samples being taken from a positive electrode composite material layer. A non-aqueous electrolyte secondary battery was fabricated with the positive electrode plate, battery performance was evaluated, and correlation between the battery performance and standard deviation σ was verified.

Example 1

(Step S100: Fabrication of Positive Electrode Plate)

Referring to FIG. 6, positive electrode plate 100, which was a sheet member in an elongated belt shape and had a non-composite-material portion in which positive electrode collector 100a was continuously exposed on one side in the direction of the short side, was fabricated. In this experiment, positive electrode plate 100 in FIG. 6 had a length dimension L1 of 4500 mm and positive electrode composite material layer 100b had a width dimension W1 of 94 mm.

(Step S101: Fabrication of First Positive Electrode Composite Material Paste)

As first positive electrode active material particles 11, powders (average particle size: 6 μm) of $LiNi_{1/3}Co_{1/3}Mn_{1/3}O_2$, AB powders (conductive material), and PVdF powders (binder) were prepared. In the description below, "$LiNi_{1/3}Co_{1/3}Mn_{1/3}O_2$" is abbreviated as "NCM".

(1-1: Dry-Mixing)

A mixer including the PLM and the DS was prepared. NCM powders (9.5 kg), AB powders (0.52 kg), and PVdF powders (0.31 kg) were weighed and introduced in a mixing tank of the mixer, the number of rotations of the PLM was set to 20 rpm, and dry-mixing was carried out for 10 minutes.

(1-2: High-Shear-Mixing)

Then, NMP (2.6 kg) was added to the powder mixture, the number of rotations of the PLM was set to 40 rpm, and high-shear-mixing was carried out for 30 minutes.

(1-3: Dilution and Dispersion)

Thereafter, NMP (4.3 kg) was further added, the number of rotations of the PLM was set to 20 rpm, the number of rotations of the DS was set to 3000 rpm, and dilution and dispersion was carried out for 10 minutes. Thus, the first positive electrode composite material paste was obtained.

The first positive electrode composite material paste is hereinafter also denoted as "PST(1)". A mass ratio of a solid content in the PST(1) is set to NCM:AB:PVdF=92:5:3. Table 1 shows a condition for fabricating the PST(1).

TABLE 1

| | Amount of Blended Solid Content | | | 1-1 Dry-Mixing | | 1-2 High-Shear-Mixing | | | 1-3 Dilution and Dispersion | | | |
|---|---|---|---|---|---|---|---|---|---|---|---|---|
| | First Positive Electrode Active Material Particles | Conductive Material | Binder | | | Amount of Introduction of Solvent | | | Amount of Addition of Solvent | | | |
| PST(1) | NCM kg | AB kg | PVdF kg | PLM rpm | Time min | NMP kg | PLM rpm | Time min | NMP kg | PLM rpm | DS rpm | Time min |
| Comparative Example 1 | 10.0 | 0.54 | 0.33 | 20 | 10 | 2.7 | 40 | 90 | 4.5 | 20 | 3000 | 10 |
| Example 1 | 9.5 | 0.52 | 0.31 | 20 | 10 | 2.6 | 40 | 30 | 4.3 | 20 | 3000 | 10 |
| Example 2 | 9.5 | 0.52 | 0.31 | 20 | 10 | 2.6 | 40 | 50 | 4.3 | 20 | 3000 | 10 |
| Example 3 | 9.5 | 0.52 | 0.31 | 20 | 10 | 2.6 | 40 | 70 | 4.3 | 20 | 3000 | 10 |
| Example 4 | 9.5 | 0.52 | 0.31 | 20 | 10 | 2.6 | 40 | 90 | 4.3 | 20 | 3000 | 10 |
| Comparative Example 4 | 9.5 | 0.52 | 0.31 | 20 | 10 | 2.6 | 40 | 110 | 4.3 | 20 | 3000 | 10 |
| Comparative Example 5 | 9.5 | 0.52 | 0.31 | 20 | 10 | 2.6 | 40 | 130 | 4.3 | 20 | 3000 | 10 |
| Example 5 | 8.0 | 0.43 | 0.26 | 20 | 10 | 2.2 | 40 | 30 | 3.6 | 20 | 3000 | 10 |
| Example 6 | 8.0 | 0.43 | 0.26 | 20 | 10 | 2.2 | 40 | 50 | 3.6 | 20 | 3000 | 10 |
| Example 7 | 8.0 | 0.43 | 0.26 | 20 | 10 | 2.2 | 40 | 70 | 3.6 | 20 | 3000 | 10 |
| Example 8 | 8.0 | 0.43 | 0.26 | 20 | 10 | 2.2 | 40 | 90 | 3.6 | 20 | 3000 | 10 |
| Comparative Example 8 | 8.0 | 0.43 | 0.26 | 20 | 10 | 2.2 | 40 | 110 | 3.6 | 20 | 3000 | 10 |
| Comparative Example 9 | 8.0 | 0.43 | 0.26 | 20 | 10 | 2.2 | 40 | 130 | 3.6 | 20 | 3000 | 10 |

(Step S102: Fabrication of Second Positive Electrode Composite Material Paste)

As second positive electrode active material particles 12, powders (average particle size: 1 μm) of composite particles containing secondary particles which were an aggregate of LiFePO$_4$ (primary particles) were prepared. In these composite particles, a carbon covering layer (a conductive layer) was formed on a surface of primary particles, and a mass ratio between a base material and the covering layer was set to lithium iron phosphate (base material): carbon (covering layer)=99:1. These composite particles are hereinafter abbreviated as "LFPO".

(2-1: Dry-Mixing)

LFPO powders (0.5 kg), AB powders (0.027 kg), and PVdF powders (0.016 kg) were weighed and introduced in a mixing tank of the mixer, the number of rotations of the PLM was set to 20 rpm, and dry-mixing was carried out for 10 minutes.

(2-2: High-Shear-Mixing)

Then, NMP (0.23 kg) was added to the powder mixture, the number of rotations of the PLM was set to 40 rpm, and high-shear-mixing was carried out for 30 minutes.

(2-3: Dilution and Dispersion)

Thereafter, NMP (0.31 kg) was further added, the number of rotations of the PLM was set to 20 rpm, the number of rotations of the DS was set to 3000 rpm, and dilution and dispersion was carried out for 10 minutes. Thus, the second positive electrode composite material paste was obtained. The second positive electrode composite material paste is hereinafter also denoted as "PST(2)". A mass ratio of a solid content in the PST(2) is set to LFPO:AB:PVdF=92:5:3. Table 2 shows a condition for fabricating the PST(2).

trode composite material paste fabricated in such a manner is hereinafter also denoted as "PST(1)+PST(2)".

(Step S104: Formation of Positive Electrode Composite Material Layer)

Then, positive electrode composite material layer 100b was formed by coating each surface of an Al foil having a thickness of 15 μm (positive electrode collector 100a) with the third positive electrode composite material paste with the use of a die coater and drying the paste. Then, positive electrode composite material layer 100b was rolled with a rolling machine and cut to a prescribed width with the use of a slitter.

Positive electrode plate 100 [thickness: 120 μm (including a thickness of the Al foil)] was thus obtained. In positive electrode plate 100, positive electrode composite material layer 100b (one side) had a thickness of 52.5 μm. In positive electrode composite material layer 100b, a ratio of second positive electrode active material particles 12 in a total mass of first positive electrode active material particles 11 and second positive electrode active material particles 12 was 5 mass %.

(Step S200: Fabrication of Negative Electrode Plate)

Referring to FIG. 7, negative electrode plate 200, which was a sheet member in an elongated belt shape and had a non-composite-material portion where negative electrode collector 200a was continuously exposed on one side in the direction of the short side, was fabricated. In this experiment, negative electrode plate 200 in FIG. 7 had a length dimension L2 of 4700 mm and negative electrode composite material layer 200b had a width dimension W2 of 100 mm.

Initially, a negative electrode composite material paste was obtained by mixing graphite powders (negative electrode active material), CMC (thickener), and SBR (binder) at a ratio of graphite:CMC:SBR=98:1:1 (mass ratio) and kneading the mixture in water.

TABLE 2

| | Amount of Blended Solid Content | | | 2-1 Dry-Mixing | | 2-2 High-Shear-Mixing | | | 2-3 Dilution and Dispersion | | | |
|---|---|---|---|---|---|---|---|---|---|---|---|---|
| | Second Positive Electrode Active Material Particles | Conductive Material | Binder | | | Amount of Introduction of Solvent | | | Amount of Addition of Solvent | | | |
| PST(2) | LFPO kg | AB kg | PVdF kg | PLM rpm | Time min | NMP kg | PLM rpm | Time min | NMP kg | PLM rpm | DS rpm | Time min |
| Example 1 | 0.5 | 0.027 | 0.016 | 20 | 10 | 0.23 | 40 | 30 | 0.31 | 20 | 3000 | 10 |
| Example 2 | 0.5 | 0.027 | 0.016 | 20 | 10 | 0.23 | 40 | 50 | 0.31 | 20 | 3000 | 10 |
| Example 3 | 0.5 | 0.027 | 0.016 | 20 | 10 | 0.23 | 40 | 70 | 0.31 | 20 | 3000 | 10 |
| Example 4 | 0.5 | 0.027 | 0.016 | 20 | 10 | 0.23 | 40 | 90 | 0.31 | 20 | 3000 | 10 |
| Comparative Example 4 | 0.5 | 0.027 | 0.016 | 20 | 10 | 0.23 | 40 | 110 | 0.31 | 20 | 3000 | 10 |
| Comparative Example 5 | 0.5 | 0.027 | 0.016 | 20 | 10 | 0.23 | 40 | 130 | 0.31 | 20 | 3000 | 10 |
| Example 5 | 2.0 | 0.11 | 0.065 | 20 | 10 | 0.93 | 40 | 30 | 1.2 | 20 | 3000 | 10 |
| Example 6 | 2.0 | 0.11 | 0.065 | 20 | 10 | 0.93 | 40 | 50 | 1.2 | 20 | 3000 | 10 |
| Example 7 | 2.0 | 0.11 | 0.065 | 20 | 10 | 0.93 | 40 | 70 | 1.2 | 20 | 3000 | 10 |
| Example 8 | 2.0 | 0.11 | 0.065 | 20 | 10 | 0.93 | 40 | 90 | 1.2 | 20 | 3000 | 10 |
| Comparative Example 8 | 2.0 | 0.11 | 0.065 | 20 | 10 | 0.93 | 40 | 110 | 1.2 | 20 | 3000 | 10 |
| Comparative Example 9 | 2.0 | 0.11 | 0.065 | 20 | 10 | 0.93 | 40 | 130 | 1.2 | 20 | 3000 | 10 |

(Step S103: Fabrication of Third Positive Electrode Composite Material Paste)

The PST(1) and the PST(2) obtained as above were introduced in a mixing tank of a mixer, the number of rotations of the PLM was set to 20 rpm, the number of rotations of the DS was set to 3000 rpm, and the pastes were mixed for 20 minutes. A third positive electrode composite material paste was thus obtained. The third positive elec- Then, negative electrode composite material layer 200b was formed by coating each surface of a Cu foil having a thickness of 10 μm (negative electrode collector 200a) with the negative electrode composite material paste with the use of a die coater and drying the paste. Then, negative electrode composite material layer 200b was rolled with a rolling machine and cut to a prescribed width with the use of a slitter. Negative electrode plate 200 (thickness: 130 μm) was thus obtained.

(Preparation of Non-Aqueous Electrolyte)

A solvent mixture was obtained by mixing EC, DMC, and EMC at a ratio of EC:DMC:EMC=3:3:4 (a volume ratio). Then, a non-aqueous electrolyte was prepared by dissolving $LiPF_6$ (1.0 mol/L) in the solvent mixture.

(Step S300 to Step S600: Assembly)

Separator 300 (thickness: 24 μm) having a three-layered structure of PP/PE/PP was prepared. Referring to FIG. 8, an electrode group in an oval shape was obtained by winding positive electrode plate 100 and negative electrode plate 200 such that they were opposed to each other with separator 300 lying therebetween, and electrode assembly 400 was obtained by press-forming the electrode group to a flat shape (step S300).

Lid body 500a provided with positive electrode terminal 104 and negative electrode terminal 204 in advance and case 500b with a bottom in a prismatic shape were prepared (that is, the exterior body was prepared). Referring to FIGS. 8 and 9, positive electrode collector 100a exposed at one end portion on axis of winding AW of electrode assembly 400 and positive electrode collector plate 102 were welded to each other, and negative electrode collector 200a exposed at the other end portion and negative electrode collector plate 202 were welded to each other. Furthermore, positive electrode collector plate 102 and positive electrode terminal 104 were welded to each other, and negative electrode collector plate 202 and negative electrode terminal 204 were welded to each other.

Then, electrode assembly 400 was inserted in case 500b (step S400), and lid body 500a and case 500b were integrated with each other by welding a portion where they are fitted to each other. Furthermore, a prescribed amount of non-aqueous electrolyte was injected through an inlet (not shown) provided in lid body 500a (step S500), and the inside was hermetically sealed by attaching a screw (a stopper) to the inlet and tightening the screw (step S600). A non-aqueous electrolyte secondary battery in a prismatic shape having a design capacity of 25 Ah was thus obtained.

Example 2 to Example 4

A positive electrode plate was obtained and a non-aqueous electrolyte secondary battery was further obtained as in Example 1 except for change in time period for mixing in "1-2: High-Shear-Mixing" and "2-2: High-Shear-Mixing" above, as shown in Tables 1 and 2.

Comparative Example 1

A positive electrode plate was obtained and a non-aqueous electrolyte secondary battery was further obtained as in Example 1 except that the PST(1) was obtained under conditions shown in Table 1 and a positive electrode composite material layer was formed by coating each main surface of a positive electrode collector with the PST(1) and drying the PST(1). Comparative Example 1 corresponds to a comparative example in which no LFPO was contained in the positive electrode composite material layer.

Comparative Example 2 and Comparative Example 3

A positive electrode composite material paste was obtained by collectively mixing and kneading NCM and LFPO as in the conventional technique, under conditions shown in Table 3. A positive electrode composite material paste fabricated in such a manner is hereinafter also denoted as "PST(1+2)". Then, a positive electrode plate was obtained and a non-aqueous electrolyte secondary battery was further obtained as in Example 1 except that a positive electrode composite material layer was formed by coating each main surface of a positive electrode collector with the PST(1+2) and drying the PST(1+2).

TABLE 3

| | Amount of Blended Solid Content | | | | | | High-Shear-Mixing | | | Dilution and Dispersion | | | |
|---|---|---|---|---|---|---|---|---|---|---|---|---|---|
| | First Positive Electrode Active Material Particles | Second Positive Electrode Active Material Particles | Conductive Material | Binder | Dry-Mixing | | | Amount of Introduction of Solvent | | | Amount of Addition of Solvent | | | |
| PST(1 + 2) | NCM kg | LFPO kg | AB kg | PVdF kg | PLM rpm | Time min | NMP kg | PLM rpm | Time min | NMP kg | PLM rpm | DS rpm | Time min |
| Comparative Example 2 | 9.5 | 0.5 | 0.54 | 0.33 | 20 | 10 | 2.7 | 40 | 30 | 4.5 | 20 | 3000 | 10 |
| Comparative Example 3 | 9.5 | 0.5 | 0.54 | 0.33 | 20 | 10 | 2.7 | 40 | 90 | 4.5 | 20 | 3000 | 10 |
| Comparative Example 6 | 8.0 | 2.0 | 0.54 | 0.33 | 20 | 10 | 2.7 | 40 | 30 | 4.5 | 20 | 3000 | 10 |
| Comparative Example 7 | 8.0 | 2.0 | 0.54 | 0.33 | 20 | 10 | 2.7 | 40 | 90 | 4.5 | 20 | 3000 | 10 |

Comparative Example 4 and Comparative Example 5

A positive electrode plate was obtained and a non-aqueous electrolyte secondary battery was further obtained as in Example 1 except for change in time period for mixing in "1-2: High-Shear-Mixing" and "2-2: High-Shear-Mixing" above, as shown in Tables 1 and 2.

Example 5

A positive electrode plate was obtained and a non-aqueous electrolyte secondary battery was further obtained as in Example 1 except that the PST(1) and the PST(2) were fabricated under conditions shown in Tables 1 and 2. A ratio of second positive electrode active material particles 12 in a total mass of first positive electrode active material particles 11 and second positive electrode active material particles 12 in positive electrode composite material layer 100b in Example 5 was 20 mass %.

Example 6 to Example 8

A positive electrode plate was obtained and a non-aqueous electrolyte secondary battery was further obtained as in Example 5 except for change in time period for mixing in "1-2: High-Shear-Mixing" and "2-2: High-Shear-Mixing" above, as shown in Tables 1 and 2.

Comparative Example 6 and Comparative Example 7

The PST(1+2) was obtained by collectively mixing and kneading NCM and LFPO under conditions shown in Table 3. Then, a positive electrode plate was obtained and a non-aqueous electrolyte secondary battery was further obtained as in Comparative Example 2 and Comparative Example 3 except that a positive electrode composite material layer was formed by coating each main surface of a positive electrode collector with the PST(1+2) and drying the PST(1+2).

Comparative Example 8 and Comparative Example 9

A positive electrode plate was obtained and a non-aqueous electrolyte secondary battery was further obtained as in Example 5 except for change in time period for mixing in "1-2: High-Shear-Mixing" and "2-2: High-Shear-Mixing" above, as shown in Tables 1 and 2.

[Evaluation]

Each positive electrode plate and each battery were evaluated as follows. In the description below, the unit "C" of a current value represents a current value with which a design capacity of the battery is discharged in one hour. "CC" and "CV" represent a constant current and a constant voltage, respectively.

<Determination of Standard Deviation σ>

In the plan view shown in FIG. 6, positive electrode composite material layer 100b was divided into 5 parts by dividing positive electrode composite material layer 100b into five in the longitudinal direction. Each part was further divided into four in the direction of the short side (the direction of width) of positive electrode composite material layer 100b. Then, two pieces were randomly selected from each part and 10 measurement samples in total were obtained.

A cross-section sample of positive electrode composite material layer 100b was taken around the center of the measurement sample, and the cross-section was processed with the CP. Then, the cross-section sample was observed at a magnification of 300-fold with the use of an SEM, and an observation field of view was obtained.

Referring to FIG. 1, square measurement region MR of which one side had a length of 50 μm (that is, 0.95 time as large as thickness T of positive electrode composite material layer 100b) was extracted from positive electrode composite material layer 100b on one side in the observation field of view.

In succession, with the use of an EPMA apparatus (a trade name "JXA-8900" manufactured by "JEOL Ltd."), Fe element mapping in measurement region MR was carried out and standard deviation σ was calculated in accordance with the method described previously. Similarly, standard deviation σ of each of other measurement samples was calculated and an average value thereof was calculated. Table 4 shows results. A numeric value shown in a field of "σ" in Table 4 represents an average value of 10 samples. Therefore, this "σ" can be regarded as a representative value of the entire positive electrode composite material layer 100b. Conditions for measurement with the EPMA are as follows.

(Conditions for Measurement With EPMA)
Beam diameter: 0.5 μm
Acceleration voltage: 15 kV
Beam current: 100 nA
Measurement time period: 30 msec/pixel
The number of pixels (N×N): 100×100 pixels
<Evaluation of Battery Performance>
(Measurement of Initial Capacity)

An initial capacity (a discharged capacity) was measured by carrying out initial charging and discharging in a range from 4.1 V to 3.0 V at a current value of 0.2 C (5 A) in an environment at 25° C.

(Measurement of Initial Output)

Based on a result of measurement of the initial capacity, SOC of the battery was adjusted to 10%. Then, the battery was rested in a thermostatic chamber set to −15° C. for 3 hours, and thereafter an initial output was measured in that environment. A procedure for calculating an initial output is as follows.

Figure 12:
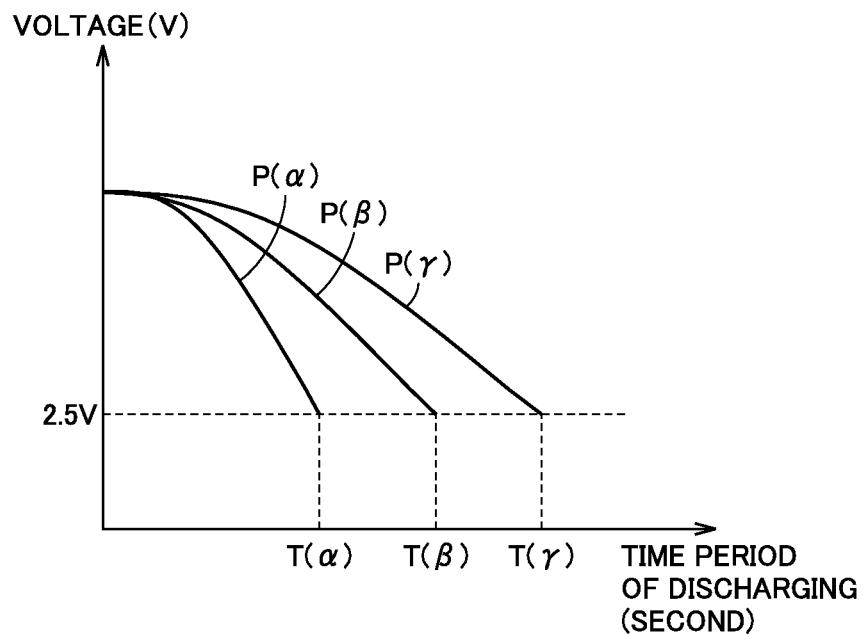
FIG. 12 is a schematic diagram illustrating a method of measuring output characteristics.
Figure 13:
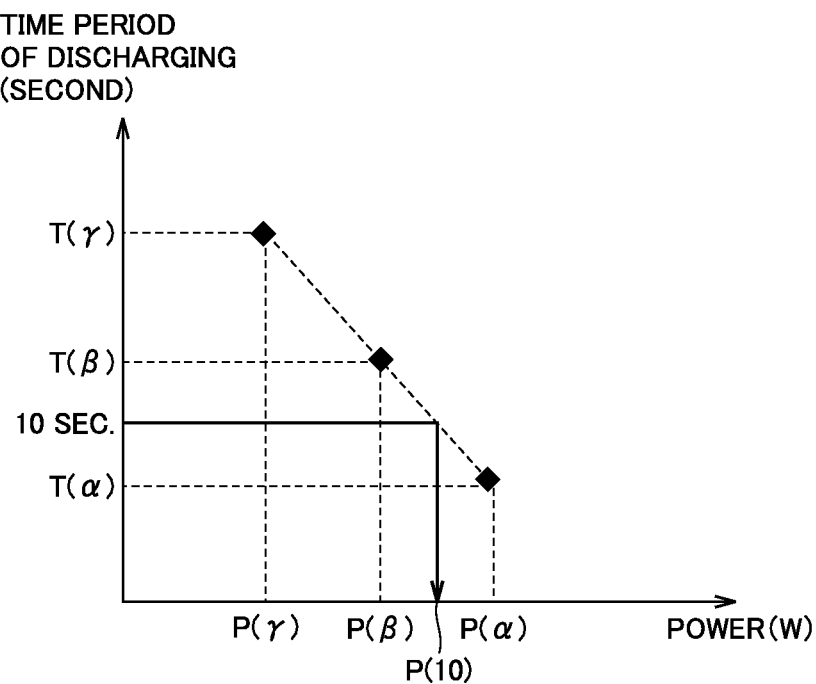
FIG. 13 is another schematic diagram illustrating a method of measuring output characteristics.

Initially, referring to FIG. 12, constant power discharging was carried out at three levels of P(α), P(β), and P(γ), and a time period for discharging until 2.5 V [T(α), T(β), and T(γ)] was counted. Then, as shown in FIG. 13, a scatter diagram was created by plotting results in a two-dimensional coordinate with the ordinate representing a time period for discharging and the abscissa representing power, and an approximation line showing relation between a time period for discharging and power was obtained. Then, a constant power output value at which a battery voltage dropped to 2.5 V in 10 seconds [P(10) in FIG. 13] was calculated from this approximation line and defined as an initial output in low SOC.

(Measurement of Post-Endurance Output)

One thousand charging and discharging cycles with a set of CC charging (current value: 2 C and end voltage: 4.1 V) and CC discharging (current value: 2 C and end voltage: 3.0 V) being defined as 1 cycle were carried out in an environment at 60° C.

After 1000 cycles, a post-endurance capacity was measured as in "Measurement of Initial Capacity" above. SOC of the battery was adjusted to 10% based on the post-endurance capacity, and a post-endurance output in low SOC was measured as in "Measurement of Initial Output" above. Then, a percentage of a value calculated by dividing the post-endurance output by the initial output was defined as a post-endurance output retention.

Table 4 shows results of measurement above. A numeric value shown in a field of "initial output" in Table 4 represents a relative value at the time when the initial output in Comparative Example 1 is defined as 100%. Table 4 also shows a form of a positive electrode composite material paste used in formation of a positive electrode composite material layer.

Figure 14:
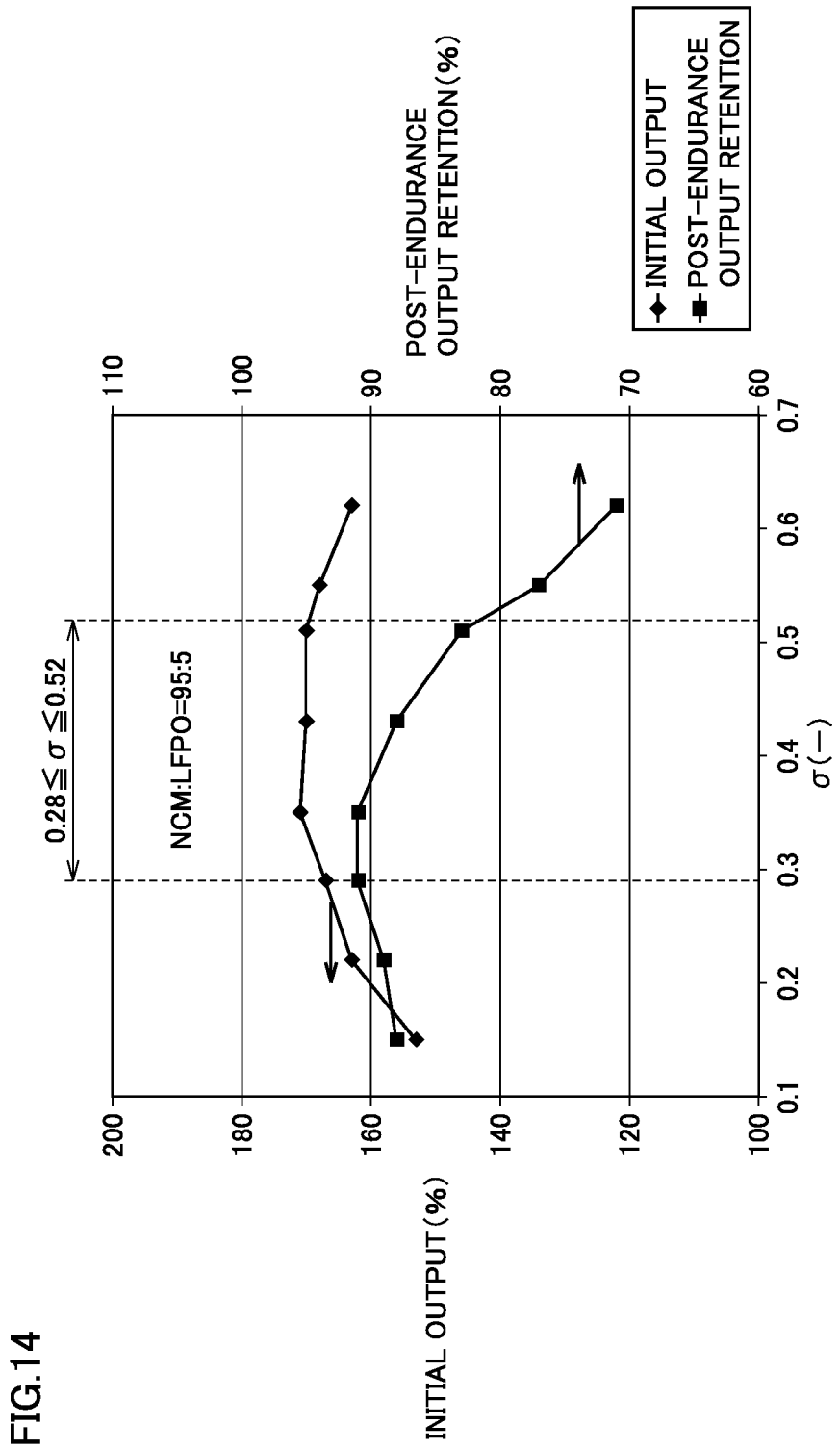
FIG. 14 is a graph showing one example of relation of a standard deviation σ with an initial output and a post-endurance output retention.
Figure 15:
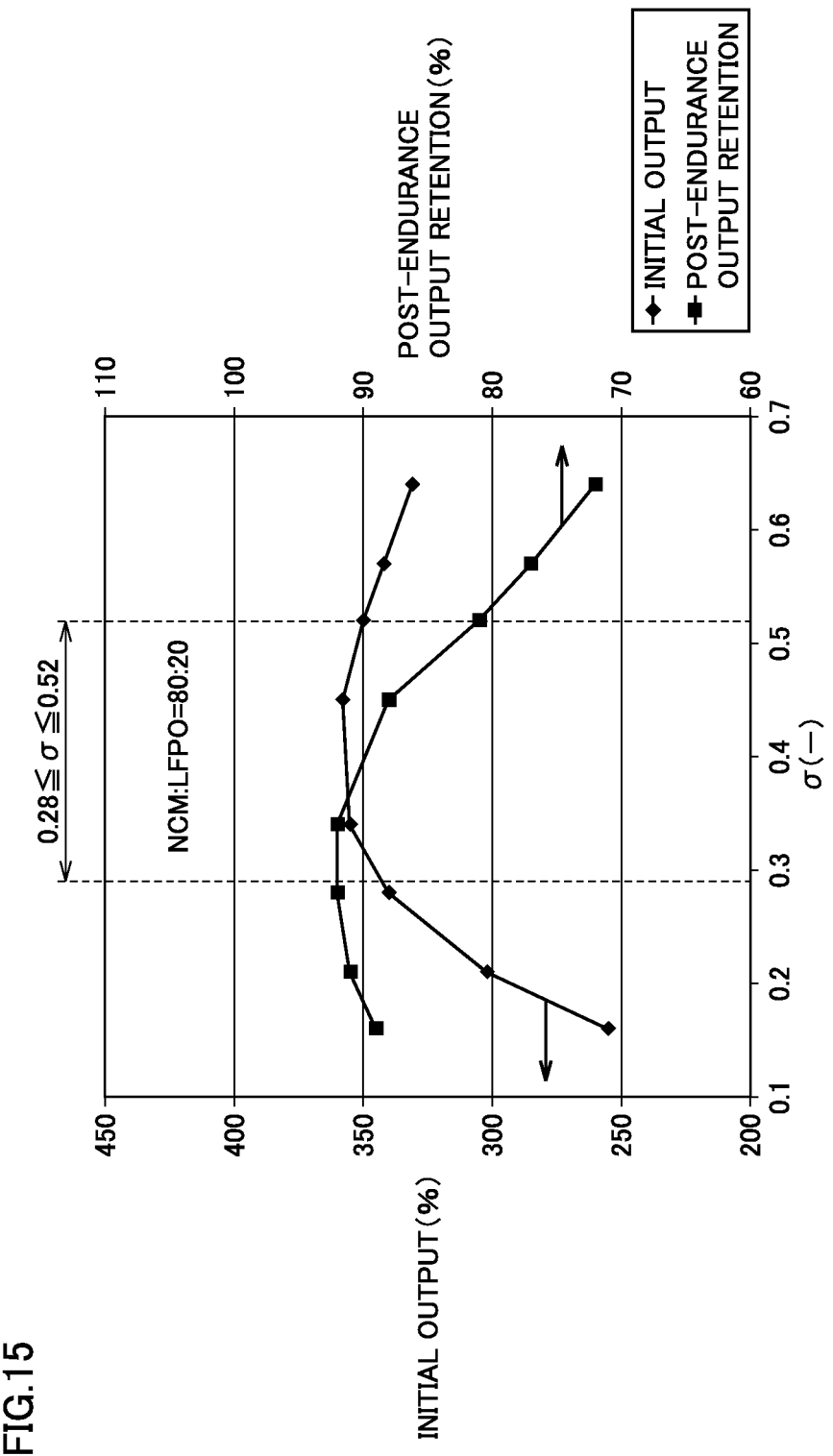
FIG. 15 is a graph showing another example of relation of standard deviation σ with an initial output and a post-endurance output retention.

FIGS. 14 and 15 show relation between σ and an output. FIG. 14 shows relation between σ and an output as plotted in a case that a ratio of blended second positive electrode active material particles with respect to a total mass of the first positive electrode active material particles and the second positive electrode active material particles is set to 5 mass %, and FIG. 15 shows relation between σ and an output as plotted in a case that a ratio of blended second positive electrode active material particles is set to 20 mass %.

that the third positive electrode composite material paste "PST(1)+PST(2)" obtained by separately fabricating the first positive electrode composite material paste and the second positive electrode composite material paste and thereafter mixing the pastes was employed in the examples and the comparative examples which could realize distribution having σ not greater than 0.52.

TABLE 4

|  | Ratio of Blended Positive Electrode Active Material Particles | | | Analysis of Cross-Section of Positive Electrode Composite Material with EPMA Indicator of State of Dispersion of Second Positive Electrode Active Material Particles σ | Battery Performance | |
| --- | --- | --- | --- | --- | --- | --- |
|  | First Positive Electrode Active Material Particles NCM Mass % | Second Positive Electrode Active Material Particles LFPO Mass % | Positive Electrode Composite Material Paste |  | Initial Output % | Post-Endurance Output Retention % |
| Comparative Example 1 | 100 | 0 | PST(1) | — | 100 | 90 |
| Comparative Example 2 | 95 | 5 | PST(1 + 2) | 0.62 | 163 | 71 |
| Comparative Example 3 | 95 | 5 | PST(1 + 2) | 0.55 | 168 | 77 |
| Example 1 | 95 | 5 | PST(1) + PST(2) | 0.51 | 170 | 83 |
| Example 2 | 95 | 5 | PST(1) + PST(2) | 0.43 | 170 | 88 |
| Example 3 | 95 | 5 | PST(1) + PST(2) | 0.35 | 171 | 91 |
| Example 4 | 95 | 5 | PST(1) + PST(2) | 0.29 | 167 | 91 |
| Comparative Example 4 | 95 | 5 | PST(1) + PST(2) | 0.22 | 163 | 89 |
| Comparative Example 5 | 95 | 5 | PST(1) + PST(2) | 0.15 | 153 | 88 |
| Comparative Example 6 | 80 | 20 | PST(1 + 2) | 0.64 | 331 | 72 |
| Comparative Example 7 | 80 | 20 | PST(1 + 2) | 0.57 | 342 | 77 |
| Example 5 | 80 | 20 | PST(1) + PST(2) | 0.52 | 350 | 81 |
| Example 6 | 80 | 20 | PST(1) + PST(2) | 0.45 | 358 | 88 |
| Example 7 | 80 | 20 | PST(1) + PST(2) | 0.34 | 355 | 92 |
| Example 8 | 80 | 20 | PST(1) + PST(2) | 0.28 | 340 | 92 |
| Comparative Example 8 | 80 | 20 | PST(1) + PST(2) | 0.21 | 302 | 91 |
| Comparative Example 9 | 80 | 20 | PST(1) + PST(2) | 0.16 | 255 | 89 |

[Results and Discussion]

1. As to Comparative Example 1

In Table 4, Comparative Example 1 not having the second positive electrode active material particles containing LFPO is significantly lower in initial output in low SOC than a case where LFPO was mixed. Therefore, in order to improve an output in low SOC, the positive electrode composite material layer is required to contain first positive electrode active material particles containing NCM (lithium nickel composite oxide) and second positive electrode active material particles containing LFPO (lithium iron phosphate).

2. As to Comparative Example 2, Comparative Example 3, Comparative Example 6, and Comparative Example 7

These comparative examples in which a positive electrode composite material paste was collectively fabricated all had σ exceeding 0.52, and were low in post-endurance output retention. Therefore, in order to ensure a post-endurance output, σ is required to be controlled to 0.52 or lower. In these comparative examples, variation in σ is very small in spite of change in time period for high-shear-mixing from 30 minutes to 90 minutes. Namely, it is difficult to control σ with the method of collectively fabricating a positive electrode composite material paste. It can be seen from Table 4

3. As to Comparative Example 4, Comparative Example 5, Comparative Example 8, and Comparative Example 9

These comparative examples were poor in initial output in spite of use of the third positive electrode composite material paste "PST(1)+PST(2)". This may be because an amount of a conductive material was insufficient with respect to individual second positive electrode active material particles due to a long time period for high-shear-mixing and resultant excessive dispersion of the second positive electrode active material particles. Therefore, in order to obtain a high initial output, a lower limit value for σ should be defined, and the lower limit value is 0.28 based on the results in the experiments.

4. As to Range of Ratio of Blended Positive Electrode Active Material Particles and σ

As shown in FIGS. 14 and 15, in any case of 5 mass % and 20 mass % of ratios of blended second positive electrode active material particles (LFPO), in a range of 0.28≤σ≤0.52, both of the initial output and the post-endurance output (post-endurance output retention) were achieved, and out of this range, either the initial output or the post-endurance output was significantly low. Therefore, it can be concluded that, at least within a range of a ratio of blended second positive electrode active material particles not lower than 5 mass % and not higher than 20 mass %, an initial output and a post-endurance output can both be achieved so long as σ satisfies a condition of 0.28≤σ≤0.52.

In addition, it can be seen from FIGS. 14 and 15 that a range allowing better balance between an initial output and a post-endurance output is 0.30≤σ≤0.50 and a range allowing particularly good balance therebetween is 0.30≤σ≤0.45.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-aqueous electrolyte secondary battery, comprising:
    a positive electrode composite material layer containing
        first positive electrode active material particles containing a lithium nickel composite oxide,
        second positive electrode active material particles containing lithium iron phosphate, and
        a conductive material,
    a ratio of said second positive electrode active material particles in a total mass of said first positive electrode active material particles and said second positive electrode active material particles being not lower than 5 mass % and not higher than 20 mass %, and
    an average of a standard deviation σ of 10 different square measurement regions (MR) chosen at random satisfies a condition of 0.28≤σ≤0.52, wherein the standard deviation of each square MR is calculated in the following expression (1):

$$\sigma = \sqrt{\frac{1}{N}\sum_{i=1}^{N}(z_i - 1)^2} \quad (1)$$

when a distribution of an iron element is determined by extracting a square measurement region of which one side has a length 0.95 times as large as a thickness of said positive electrode composite material layer from a cross-section of said positive electrode composite material layer in parallel to a direction of thickness of said positive electrode composite material layer and conducting area analysis with an electron probe microanalyzer in said measurement region, where $z_i$ represents a value obtained by normalizing $\Delta I_i$ by dividing said measurement region into N belt-shaped small regions $\Delta y_i$ (i=1, 2, ..., N) in said direction of thickness and dividing a sum value $\Delta I_I$ (i=1, 2, ..., N) of iron element detection intensity at each measurement point included in one said small region $\Delta y_i$ by an average value I of $\Delta I_i$.

2. A method of manufacturing the non-aqueous electrolyte secondary battery according to claim 1, comprising the steps of: obtaining a first positive electrode composite material paste by mixing said first positive electrode active material particles, said conductive material, a binder, and a solvent; obtaining a second positive electrode composite material paste by mixing said second positive electrode active material particles, said conductive material, a binder, and a solvent; obtaining a third positive electrode composite material paste by mixing said first positive electrode composite material paste and said second positive electrode composite material paste with each other; and forming said positive electrode composite material layer by coating a positive electrode collector with said third positive electrode composite material paste.

* * * * *